US007201643B2

(12) United States Patent
Dineen et al.

(10) Patent No.: US 7,201,643 B2
(45) **Date of Patent: *Apr. 10, 2007**

(54) HANDLE ASSEMBLY FOR TOOL

(75) Inventors: Christopher Dineen, Greenside (GB); Andrew Walker, Newton Hall (GB); Brian Wadge, Coxhoe (GB); Tim McKay, Ashington (GB); Nigel Robson, Lowfell Gateshead (GB); Ian Sokell, Spennymoor (GB)

(73) Assignee: Black & Decker Inc., Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/019,509

(22) Filed: Dec. 22, 2004

(65) Prior Publication Data

US 2006/0003679 A1 Jan. 5, 2006

(30) Foreign Application Priority Data

Jul. 2, 2004 (EP) ................................. 04253994

(51) Int. Cl.
*B24B 27/08* (2006.01)
*A47J 45/00* (2006.01)

(52) U.S. Cl. ......................... 451/356; 451/357; 16/430

(58) Field of Classification Search ................ 451/356, 451/357; 16/430
See application file for complete search history.

(56) References Cited

U.S. PATENT DOCUMENTS

| | | | | |
|---|---|---|---|---|
| 4,651,978 | A * | 3/1987 | Grafstrom | 267/219 |
| 6,308,378 | B1 * | 10/2001 | Mooty et al. | 16/430 |
| 2004/0078936 | A1 * | 4/2004 | Walker et al. | 16/430 |
| 2005/0144698 | A1 * | 7/2005 | Vito et al. | 2/161.1 |
| 2005/0200087 | A1 * | 9/2005 | Vasudeva et al. | 279/143 |

* cited by examiner

*Primary Examiner*—Lee D. Wilson
*Assistant Examiner*—Robert Scruggs
(74) *Attorney, Agent, or Firm*—John Yun; Bruce S. Shapiro; Wesley W. Muller

(57) ABSTRACT

A power sander (2) having a housing (4) and a motor within the housing is disclosed. A gripping portion adapted to be engaged by a hand of a user of the sander comprises blister packs (30), (36) comprising first and second flexible sheets defining a gel-containing chamber therebetween and containing a vibration damping gel material, the first and second sheets being sealed to each other at the periphery of each gel-containing chamber. Clamping plates (34), (40) include a body portion and pins (not shown) adapted to extend through the periphery of a corresponding blister pack and to protrude inwardly of the surface of the housing (4). The pins are then deformed by means of heat or ultrasound to secure the clamping plates (34), (40) to the housing (4).

12 Claims, 13 Drawing Sheets

HANDLE ASSEMBLY FOR TOOL

FIELD OF THE INVENTION

The present invention relates to handle assemblies for tools, and relates particularly, but not exclusively, to handle assemblies having combined friction gripping and vibration damping properties, for power tools in which an output shaft is driven by a motor.

BACKGROUND OF THE INVENTION

Known power tools, such as power drills in which a drill bit is rotated by an output shaft which is in turn rotated by means of an electric motor, generate significant amounts of vibration, which can under certain circumstances limit the length of time during which the tool can be used continuously. In addition, the housing of such tools is generally made from a durable plastics material on which it can be difficult for a user of the tool to maintain a grip when the tool is in use for a sustained period.

U.S. Pat. No. 6,308,378 discloses a gripping arrangement for a handle of a power tool in which the sides of the handle are provided with frictional gripping zones, each side of the handle including a plurality of alternating gripping zones of a softer material and a harder material. The softer material used is generally a thermoplastic elastomer or rubber material, and the harder material is generally the same material as that from which the tool housing is formed.

This known arrangement suffers from the drawback that because the softer material performs the dual functions of providing a friction grip and vibration damping, the choice of material constitutes a compromise in that although it will have acceptable friction reducing and vibration damping properties, the performance of the handle is limited because a material having optimum frictional properties will generally have unacceptable vibration damping properties, and vice versa.

WO02/38341 discloses a grip handle for a hand-held machine tool in which a hand grip is separated from the remainder of the housing by a vibration damping element consisting of an inflatable annular air filled cushion. An additional handle is provided which has a tubular grip element surrounding a further annular air cushion.

This known arrangement suffers from the drawback that the vibration damping properties of air can only be varied by adjusting the air pressure within a chamber containing the air, and even then, the range of vibration damping properties achievable is limited. Furthermore, it is difficult, and therefore expensive, to manufacture a sealed chamber containing air having a predetermined pressure.

Preferred embodiments of the present invention seek to overcome the above disadvantages of the prior art.

BRIEF SUMMARY OF THE INVENTION

According to an aspect of the present invention, there is provided a gripping portion for a power tool having a housing and a motor within said housing for actuating a working member of the tool, the gripping portion adapted to be engaged by a hand of a user of the tool and comprising:

at least one blister pack comprising first and second flexible sheets defining at least one gel-containing chamber therebetween, wherein the or each said gel-containing chamber contains a vibration damping gel material and said first and second sheets are sealed to each other at a sealing portion at the periphery of the or each said gel-containing chamber; and at least one fixing member for fixing at least one said blister pack to said housing and including a body portion and (i) at least one protrusion extending from said body portion and adapted to extend through a sealing portion of a said blister pack and engage a respective first aperture in the housing, and/or (ii) at least one second aperture in said body portion for engaging a respective protrusion on said housing and extending through a sealing portion of a said blister pack.

By providing at least one fixing member for fixing at least one said blister pack to said housing and including a body portion and (i) at least one protrusion extending from said body portion and adapted to extend through a sealing portion of a said blister pack and engage a respective first aperture in the housing, and/or (ii) at least one second aperture in said body portion for engaging a respective protrusion on said housing and extending through a sealing portion of a said blister pack, this provides the advantage of minimising the risk that the blister pack becomes detached from the handle portion and minimising the risk of inadvertent or unauthorised removal of the blister pack from the handle portion.

At least one said sealing portion may include at least one third aperture to enable a respective said protrusion to pass therethrough.

In a preferred embodiment, at least one said protrusion is provided on at least one said fixing member and is adapted to protrude from a respective said first aperture on side thereof remote from the corresponding said body portion.

The protrusions and or second apertures may be irregularly spaced.

This provides the advantage of minimising the risk of incorrect assembly of the gripping portion.

According to another aspect of the present invention, there is provided a power tool comprising:

a housing having at least one first aperture;

a motor within said housing for actuating a working member of the tool; and a gripping portion as defined above;

wherein at least one said fixing member includes at least one said protrusion fixed to a corresponding said first aperture in said housing.

At least one said protrusion may be fixed to the corresponding said second aperture by means of deformation of an end of said protrusion remote from the corresponding said body portion.

An end at least one said protrusion may be deformed by means of heat.

An end of at least one said protrusion may be deformed by means of ultrasound.

The tool may be a sander.

According to a further aspect of the present invention, there is provided a method of assembling a gripping portion for a power tool, the method comprising:

locating at least one fixing member having a body portion and at least one protrusion extending from said body portion on a housing of a power tool having at least one first aperture such that at least one said protrusion passes through a sealing portion at the periphery of a blister pack containing vibration reducing gel material, and engages a respective said first aperture; and deforming an end of at least one said protrusion remote from said body portion to fix the protrusion to the corresponding said first aperture.

The method may further comprise the step of locating at least one said blister pack on at least one said fixing member, such that at least one said protrusion extends through the sealing portion of at least one said blister pack, prior to location of said fixing member on said housing.

The step of deforming an end of at least one said protrusion may comprise deforming by means of heat.

The step of deforming an end of at least one said protrusion may comprise deforming by means of ultrasound.

BRIEF DESCRIPTION OF THE DRAWINGS

Preferred embodiments of the invention will now be described, by way of example only and not in any limitative sense, with reference to the accompanying drawings, in which:

Referring to FIGS. 1 to 9, a power sander 2 has a housing 4 supporting a mounting platen 6 for supporting a sanding head 8 (FIG. 10) for oscillatory orbital motion of the platen 6 and sanding head 8 relative to the housing 4. The housing 4 has side surfaces 10, 12, a curved front surface 14 containing an on/off switch 16 for switching electrical power to a motor 18 (FIG. 10) in the housing 4, a curved upper surface 20 and a generally saddle shaped graspable surface 22 located between the front surface 14 and upper surface 20. The graspable surface 22 has a concave upper portion 24 and concave side portions 26, 28 arranged on opposite sides of the upper portion 24.

DETAILED DESCRIPTION OF THE INVENTION

Figure 1:
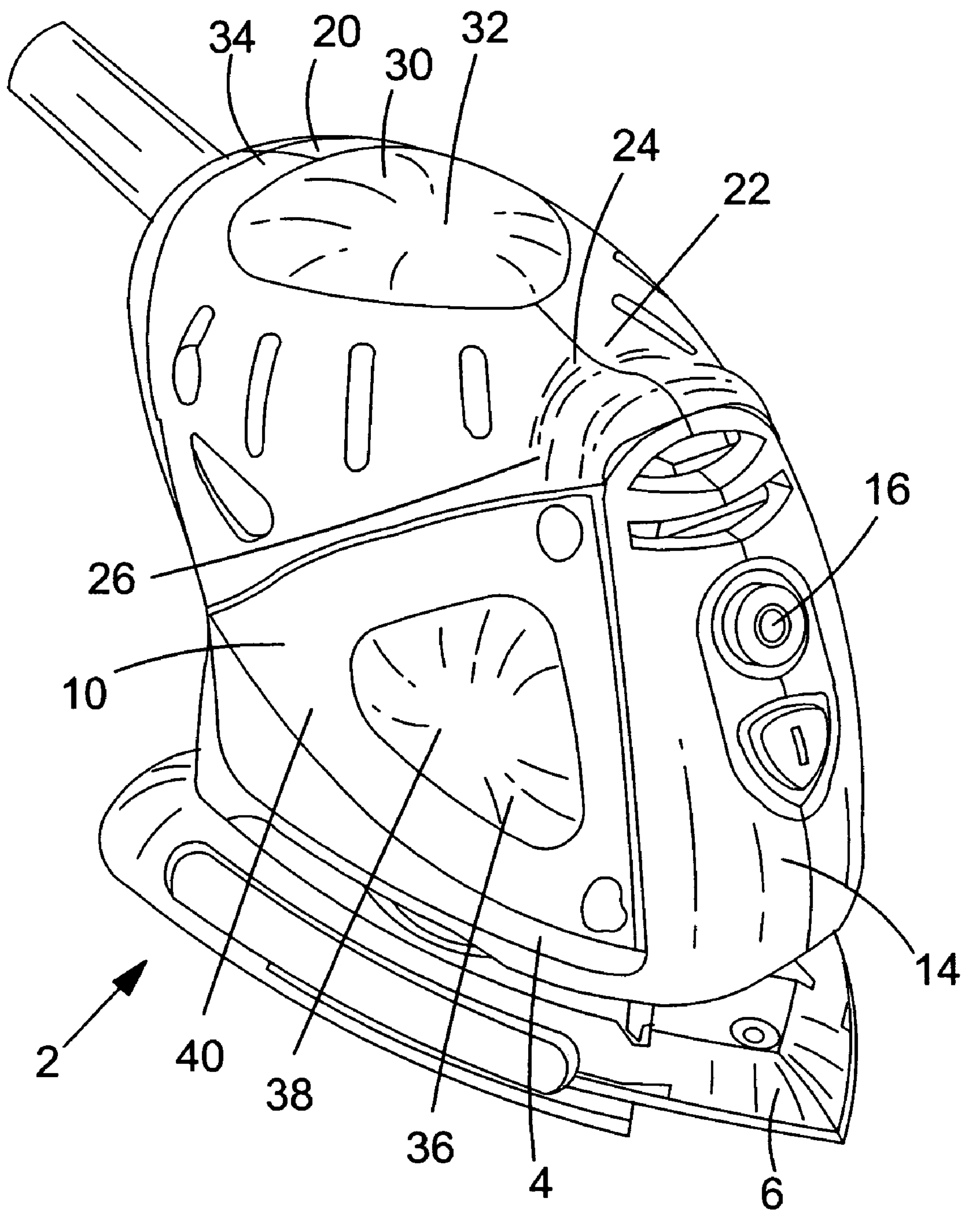
FIG. 1 is a perspective view of a power sander embodying the present invention.
Figure 2:
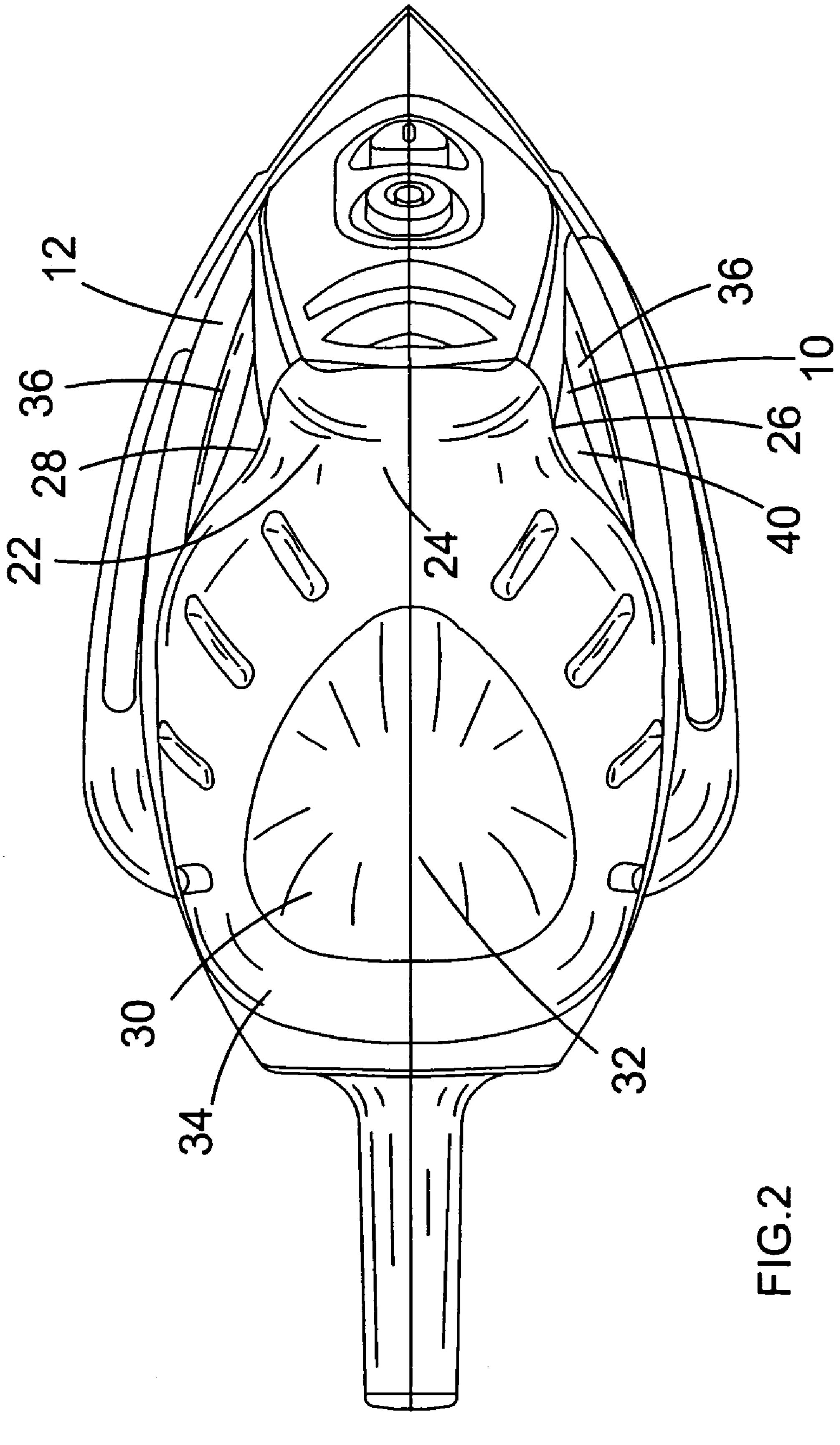
FIG. 2 is a top view of the sander of FIG. 1.
Figure 3:
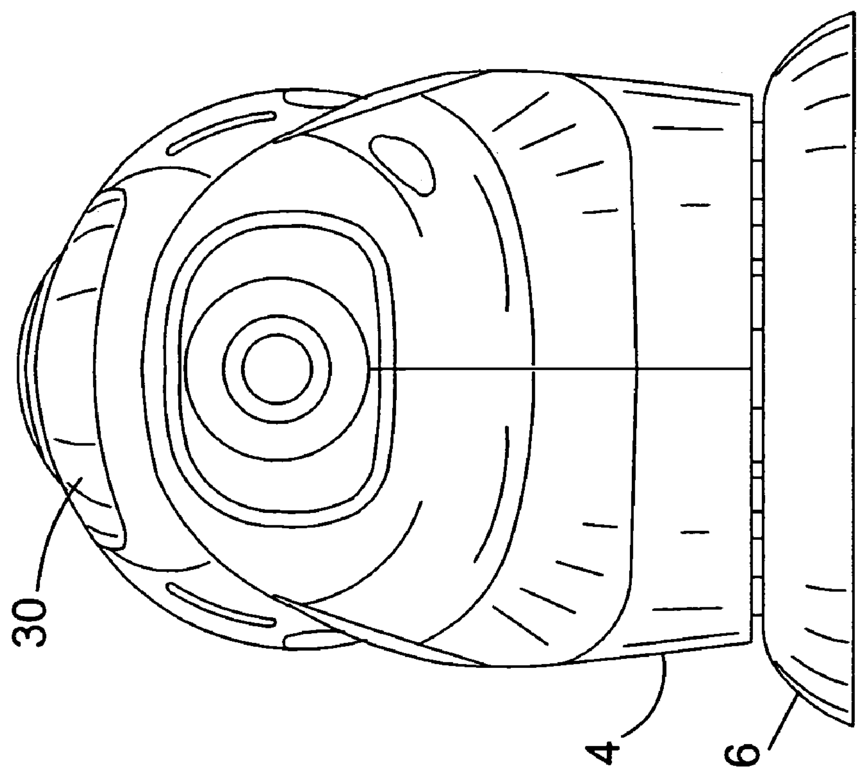
FIG. 3 is a rear view of the sander of FIG. 1.
Figure 4:
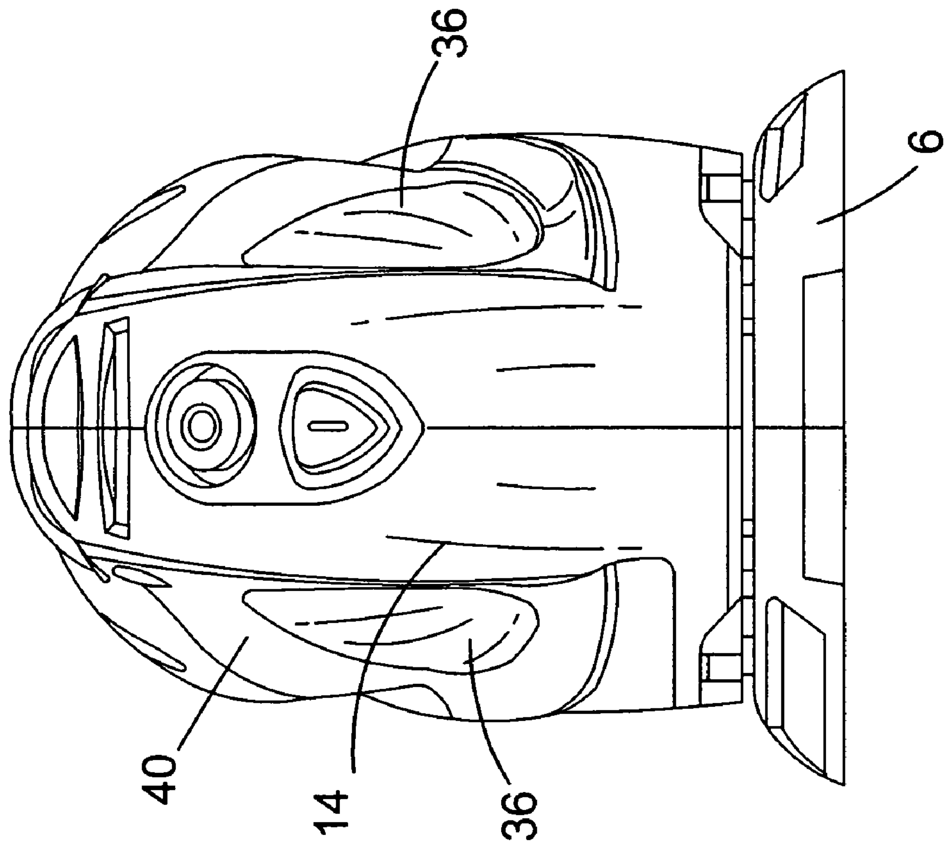
FIG. 4 is a front view of the sander of FIG. 1.
Figure 5:
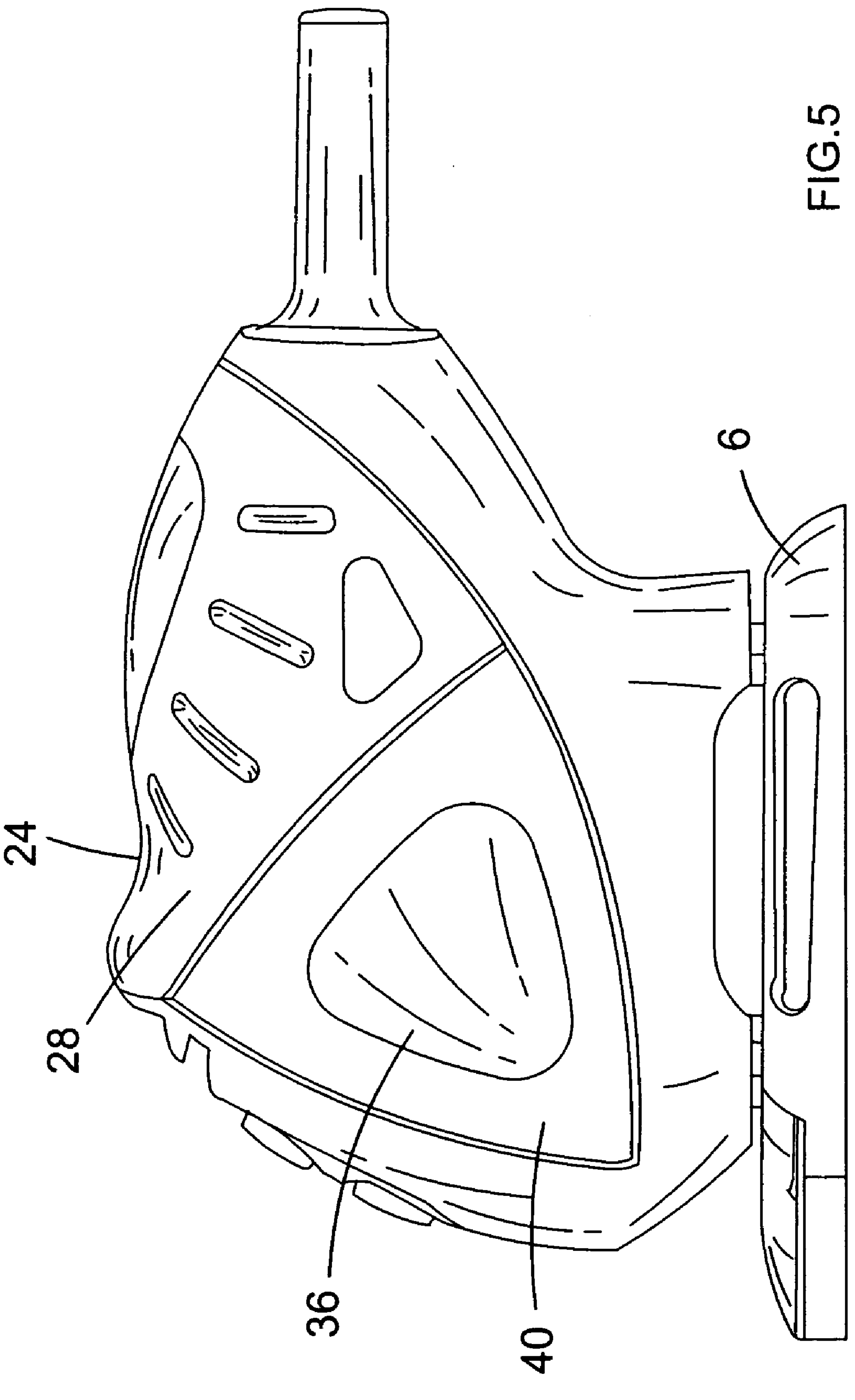
FIG. 5 is a left side view of the sander of FIG. 1.
Figure 6:
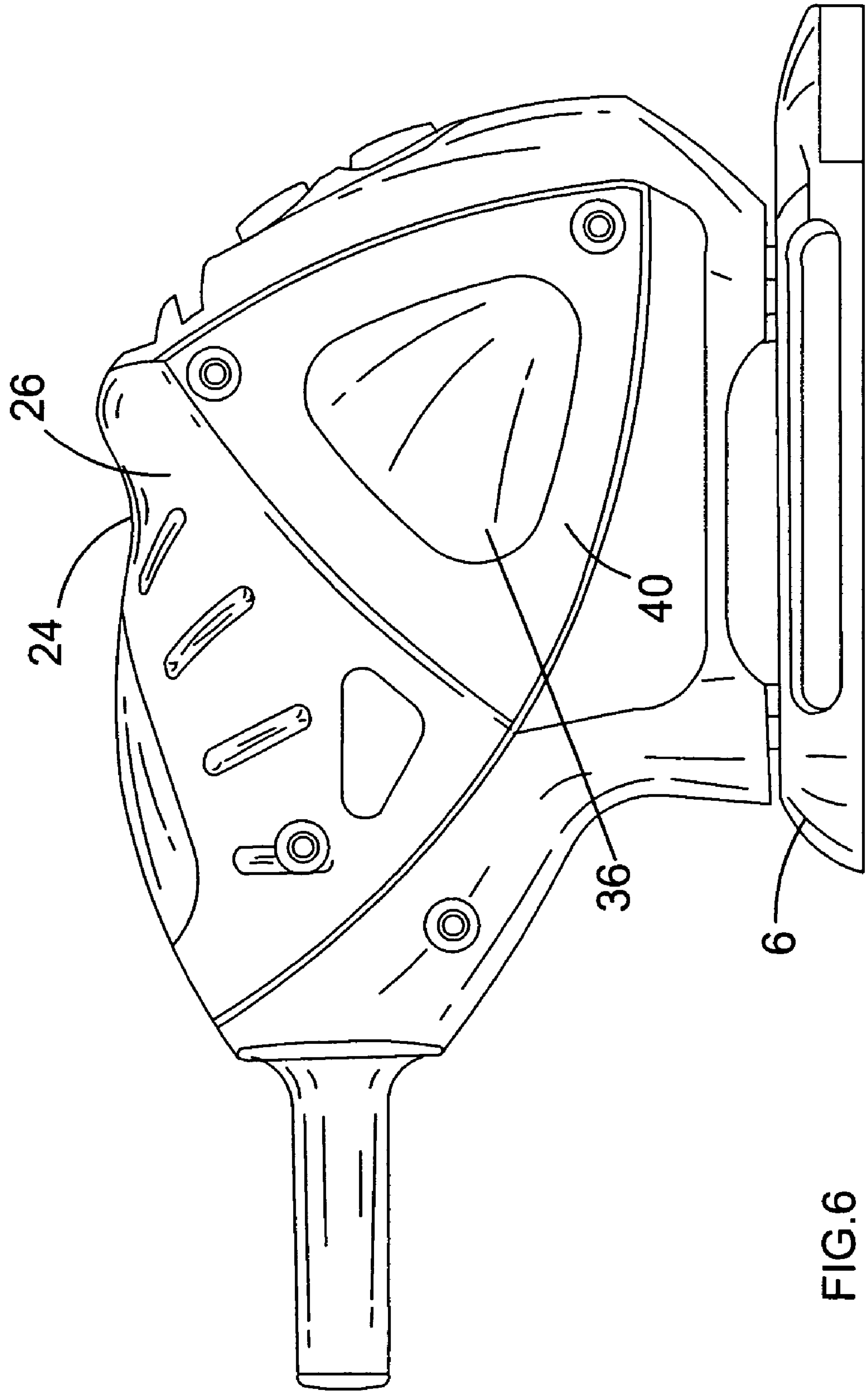
FIG. 6 is a right side view of the sander of FIG. 1.
Figure 7:
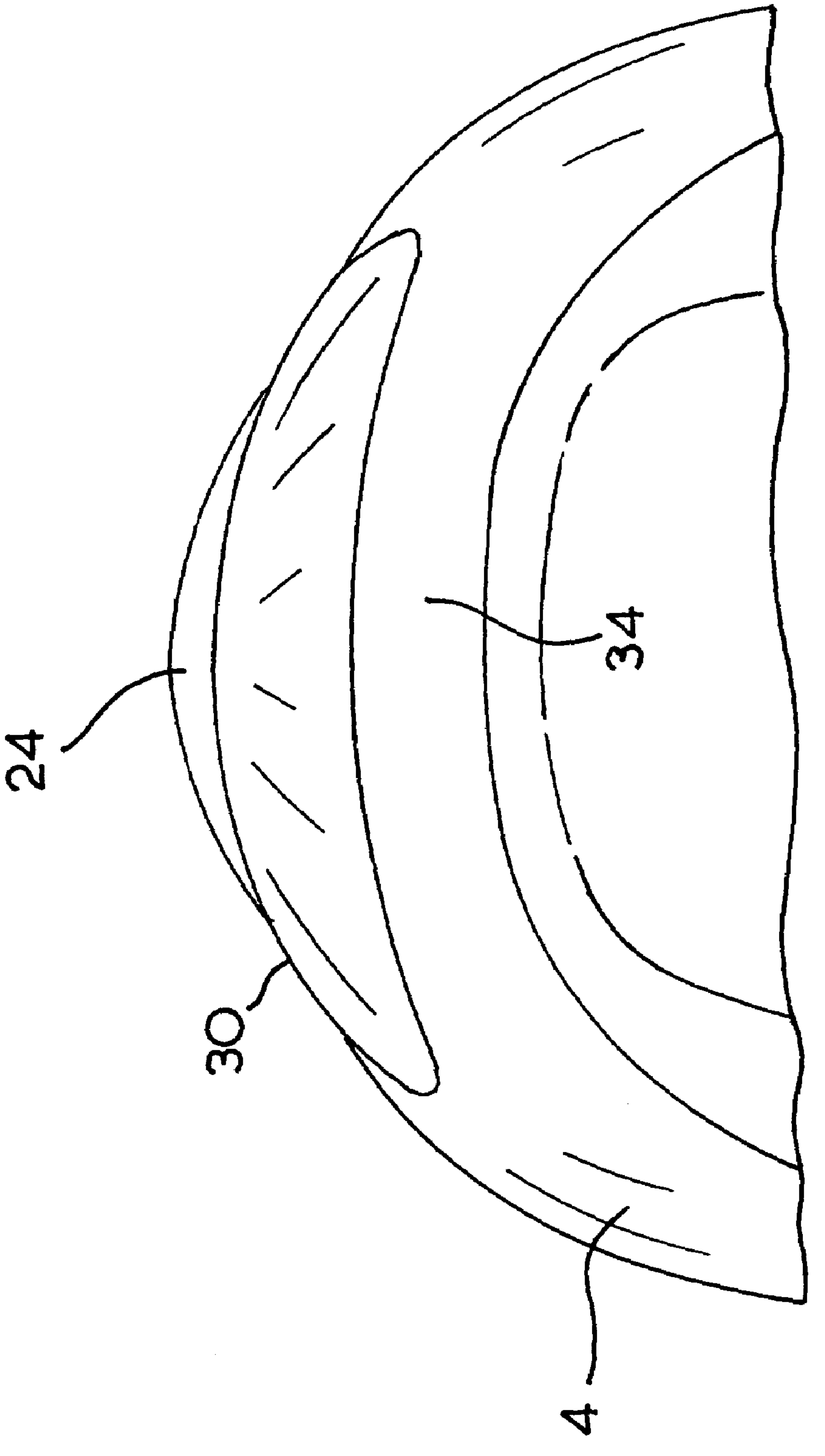
FIG. 7 is a detailed rear view of a top surface of the sander of FIG. 1.
Figure 8:
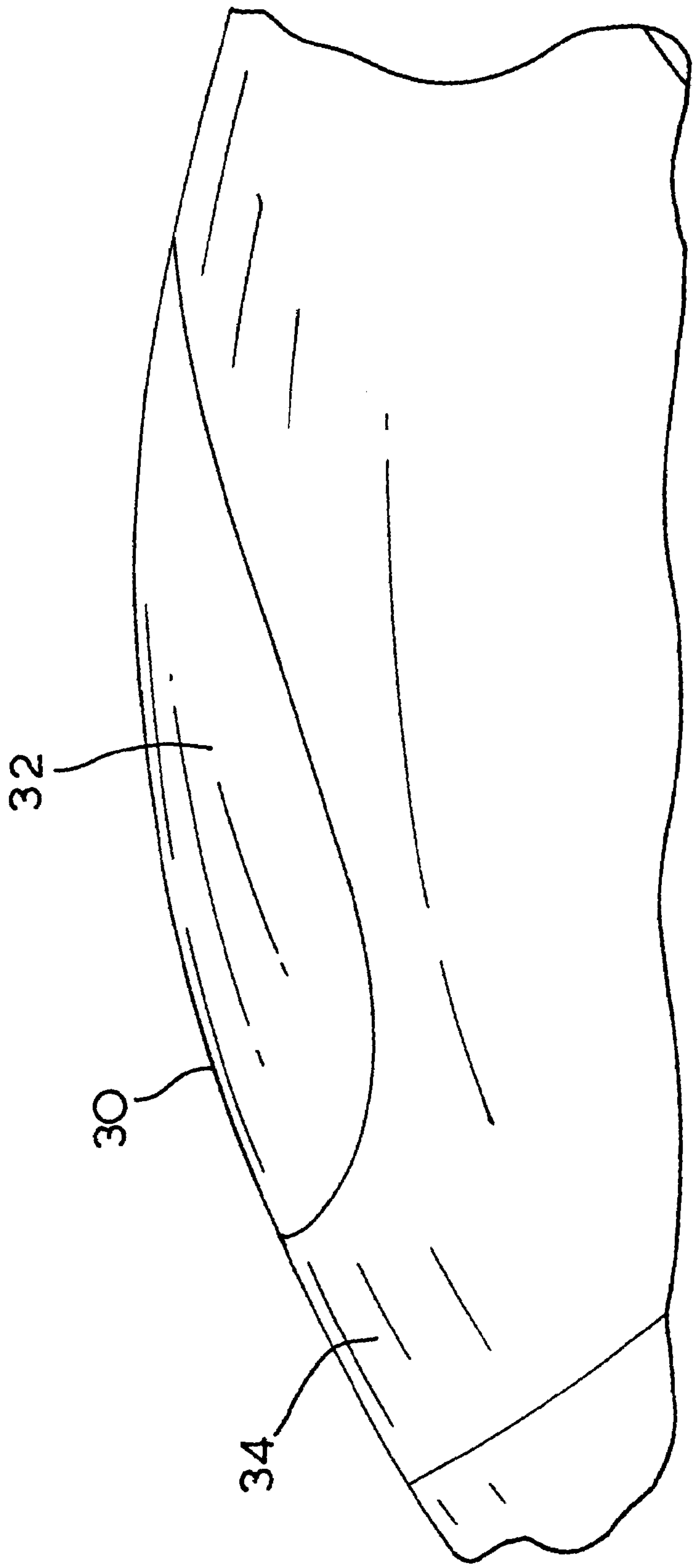
FIG. 8 is a detailed side view of the surface of FIG. 7.

For ergonomic handling of the sander by a user, the saddle shaped graspable surface 22 has a concaved upper portion 24 having a radius of curvature of about 23 mm, and side portions 26, 28 having radii of curvature of about 10 mm.

The upper surface 20 of the housing 4 is defined by a blister pack 30, defining a gel-containing chamber 32 containing vibration absorbing gel formed from a semi solid silicone rubber or polyurethane material and protruding from an aperture in a clamping plate 34. Similarly, each side surface 10, 12 is defined by a blister pack 36, defining a gel-containing chamber 38 protruding through an aperture in clamping plate 40. It can therefore be seen that the external surface of the sander 2 to be gripped by a user is defined by the gel-containing chambers 32, 38 of blister packs 30, 36 respectively, and the clamping plates 34, 40, so that the amount of vibration transmitted to a user's hand is reduced by means of the gel material contained in the blister packs 30, 36.

Figure 9A:
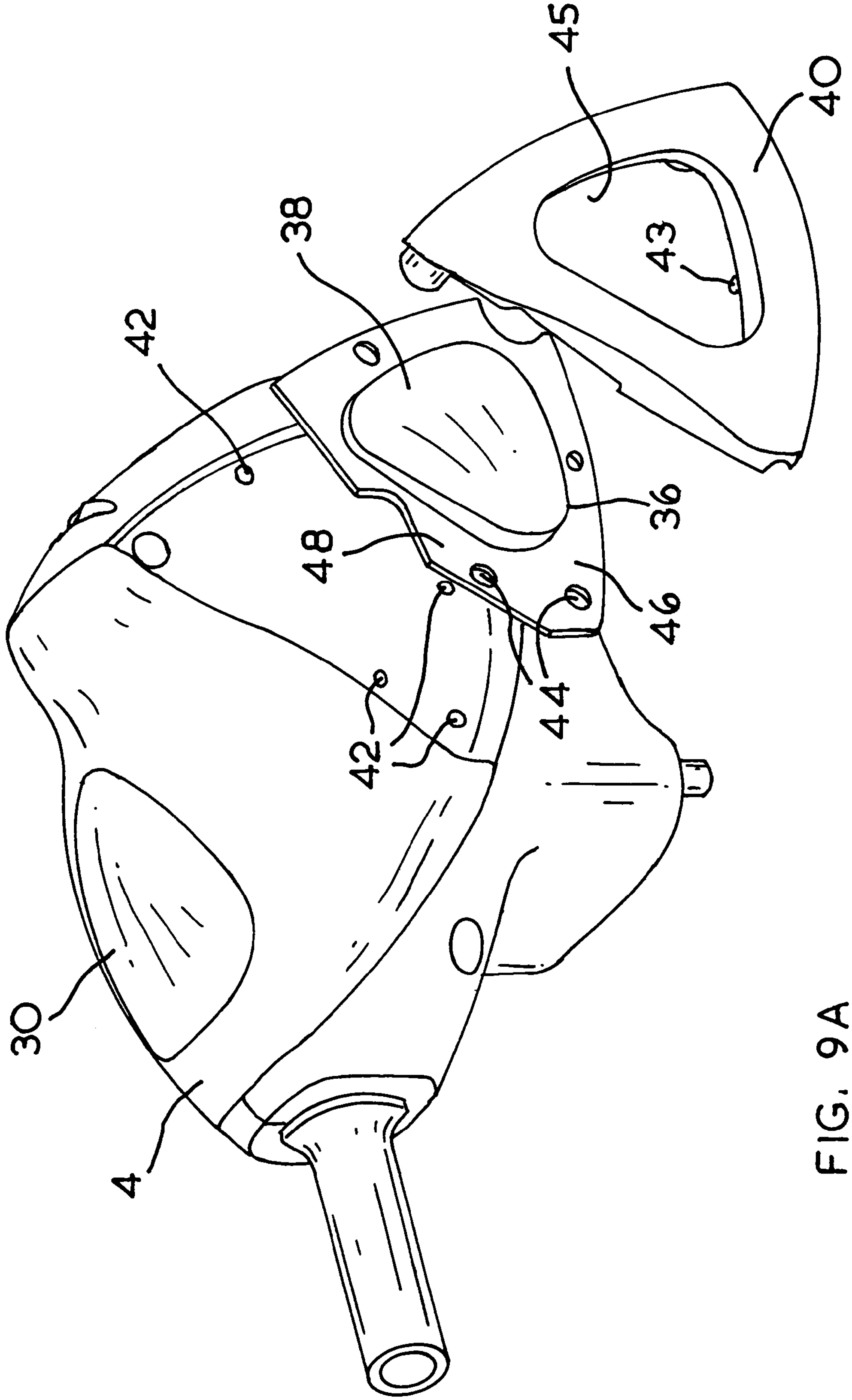
FIG. 9A is an exploded perspective view of the housing and gripping portion of the sander of FIG. 1 from the right side.
Figure 9B:
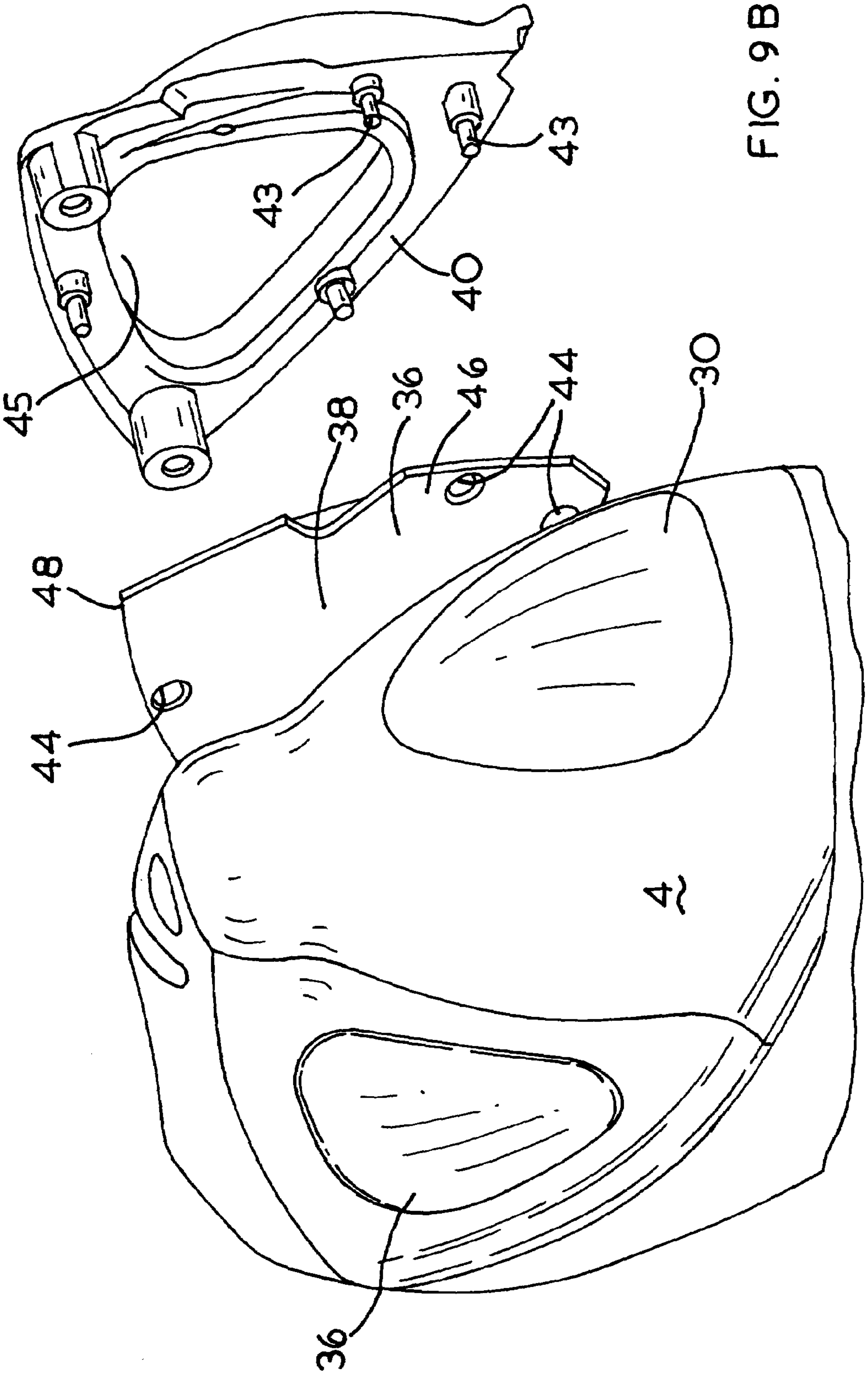
FIG. 9B is an exploded perspective view of the housing and gripping portion of the sander of FIG. 1 from the left side.

As shown in greater detail in FIGS. 9A and 9B, the blister pack 36 forming part of side surface 10 is formed from a pair of flexible sheets 46 of polyurethane material defining gel-containing chamber 38 and sealed together at a peripheral portion 48 surrounding the gel-containing chamber 38. The peripheral portion contains no vibration absorbing gel material and is pierced by a series of apertures 44 which correspond in position to apertures 42 on the part of housing 4 to which the blister pack 36 is to be mounted, and to pins 43 moulded onto the rear surface of clamping plate 40. The blister pack 36 is mounted to the housing 4 by passing the pins 43 of clamping plate 40 through the corresponding apertures 44 in the peripheral portion of blister pack 36, and then inserting the pins 43 into the corresponding apertures 42 on the housing 4. In particular, the blister pack 36 is located on the pins 43 of clamping plate 40, and the pins of the clamping plate 40 are then located in the apertures 42 on the housing. The pins 43 and apertures 42, 44 are irregularly spaced, which minimises the risk of incorrect location of the clamping plate 40, blister pack 36 and housing 4 relative to each other.

The pins 43 on clamping plate 40 are of such length that when the blister pack 36 is located on the pins and the clamping plate 40 is mounted to the housing 4 by locating the pins in apertures 42 on the housing 4, the pins protrude from the inner wall of the housing 4 to a depth of approximately 3 mm. The clamping plate 40 is then sealed to the housing 4 by a technique known to persons skilled in the art as "hot staking" in which a heated mandrel is applied to the protruding ends of the pins, which melts the protruding ends so that they are widened in a generally circular arrangement and fix the pins to the housing 4 in a manner similar to that of a rivet. Alternatively, the distal ends of the pins can be heated by means of ultrasound. The clamping plate 40 is then sealed to the housing and prevents removal of the clamping plate 40 from the housing 4, and the gel-containing chamber 38 of blister pack 36 protrudes through the aperture 45 of clamping plate 40 to define part of side surface 10, while removal of the blister pack 36 is prevented because the pins pass through the apertures 44 in the blister pack 36.

Similarly, the blister pack 36 forming part of opposite side surface 12 and the blister pack 30 forming part of upper surface 20 are secured to the housing in a similar manner by means of heat or ultrasound.

Figure 10:
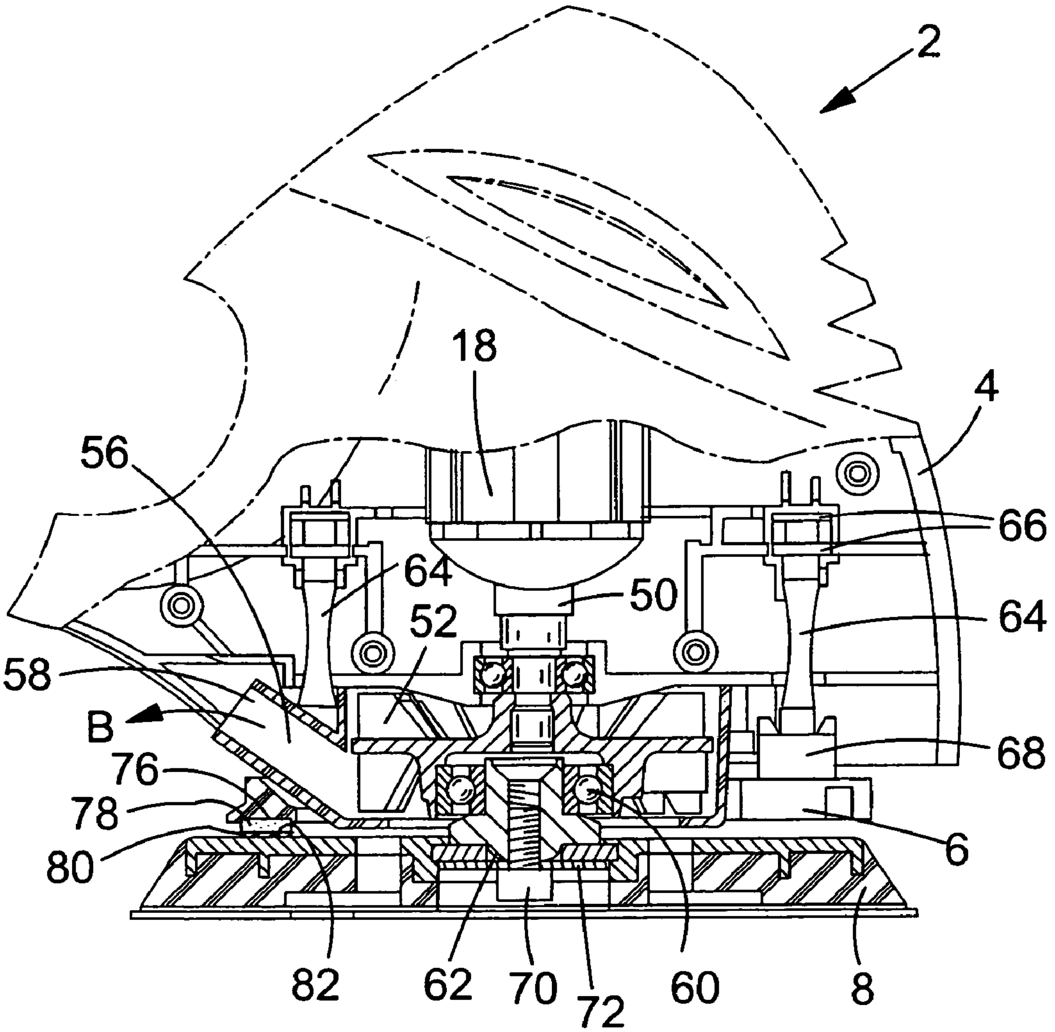
FIG. 10 is a side cross sectional view of part of the sander of FIG. 1.

FIG. 10 shows a drive unit including the electric motor 18 and first drive shaft 50. A fan 52 mounted on shaft 50 is arranged to draw air in from mouth 54 of the drive unit as shown by arrow A (FIG. 11), and direct it through extractor duct 56 to outlet 58, as shown by arrow B. Bearing 60 is eccentrically located radially in respect to shaft 50, and a second drive shaft 62 rotates about the axis of bearing 60. Mounting platen 6 is fixed to the housing 4 by means of four flexible rubber legs 64. The mounting platen 6 is substantially flat, and the legs 64 extend from a common major surface of the platen 6 (the upper surface as shown in FIG. 10), directed into the body of the housing 4. The flexible legs 64 extending from the mounting platen 6 are permanently fixed at their housing end to the housing 4, i.e. they are not removable in use by the operator. They are attached to the housing 4 by means of clamping flanges 66 of the housing 4. The flexible legs 64 are attached at their mounting platen end to the mounting platen 6 by passing through apertures in hollow projecting portions 68 that extend in the direction of the flexible legs 64 from the upper surface of the mounting platen 6. The flexible legs 64 are provided at their mounting platen 6 end with an internally screw threaded hollow recess for attachment to a securing screw. The manner in which this securement to the mounting platen is effected is described in more detail below with reference to FIG. 11.

The mounting platen 6 surrounds the second drive shaft 62, and is spaced radially therefrom. This means that the mounting platen 6 itself is not directly driven by either of the drive shafts.

In FIG. 10 a first sanding platen, which is a random orbit sanding head 8, is secured next to the mounting platen 6 onto the drive shaft 62. Securement of the random orbit sanding head 8 is achieved by a bolt 70 and washer 72. The bolt 70 passes through an aperture in the sanding head 8, through aperture 74 in the mounting platen (see FIGS. 12 and 13), and over the driving spindle of the second drive shaft 62. The sanding platen 8 is located in a parallel plane to the mounting platen 6, but is spaced from it, so that there is no contact between the facing surfaces of the mounting platen 6 and the sanding shoe 8. Therefore free rotation of the sanding platen 8 is permitted about the bearing axis 60, and the platen 8 exhibits a random orbit.

A brake pad 76 is provided on the under-surface of the mounting platen 6. The brake pad 76 comprises a resilient member 78 in the form of a ring formed from a synthetic rubber resilient material, and an abrasion resistant contact layer 80 comprising polytetrafluoroethylene (PTFE) filed with carbon fibre or glass for increased abrasion resistance. The arrangement of the layers is such that when the sanding platen 8 is secured in place onto the drive 62 then the resilient ring 78 is under compression so that a resultant load is put by the filled PTFE layer 80 onto a reaction surface part 82 of the underlying upper surface of the sanding platen 8. The purpose of this brake 76 is two-fold: first, in use, the brake acts as a speed limiter, operating in particular to prevent scratches when the unit is placed on and taken off the work surface, and secondly when the unit is switched off, the stop time is very much reduced compared to a non-braked tool. In operation the drive shaft 50 is typically driven at a rotational speed of 12000 rpm, which is too fast a speed for rotation of the sanding platen 8. The brake pad 76 limits the rotational speed of the platen to an acceptable operating speed, typically around 1200 rpm, or 10% of the rotational speed of the motor.

Figure 11:
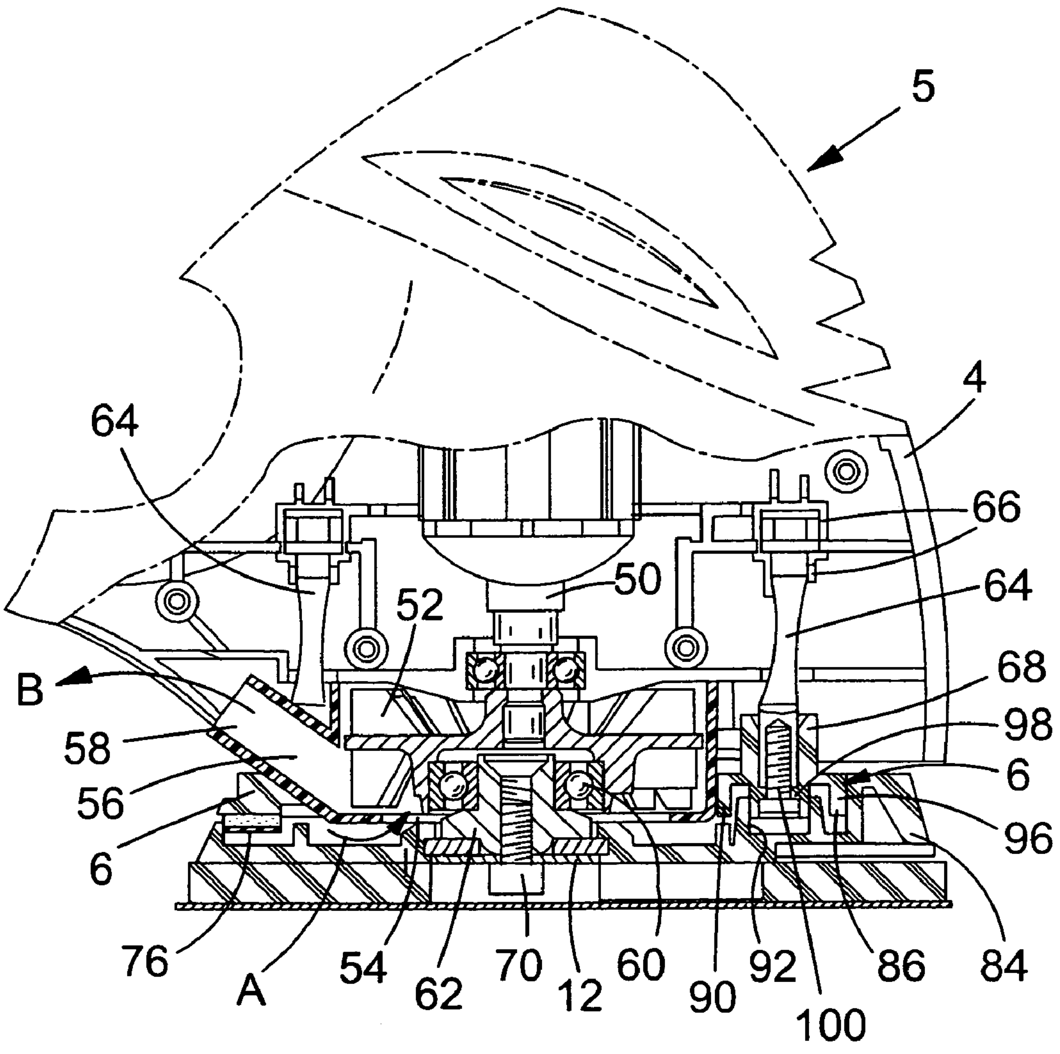
FIG. 11 is a view, corresponding to FIG. 10, of a sander of a second embodiment of the present invention.

FIG. 11 shows the drive unit of the hand tool with an orbital sanding platen 84 mounted in place of the random orbit platen of FIG. 10. Also FIGS. 12 and 13 are perspective views of the mounting platen 8 (which is common to both FIGS. 10 and 11) and the sanding platen 84 (which is shown in FIG. 11, but not in FIG. 10).

Figure 12:
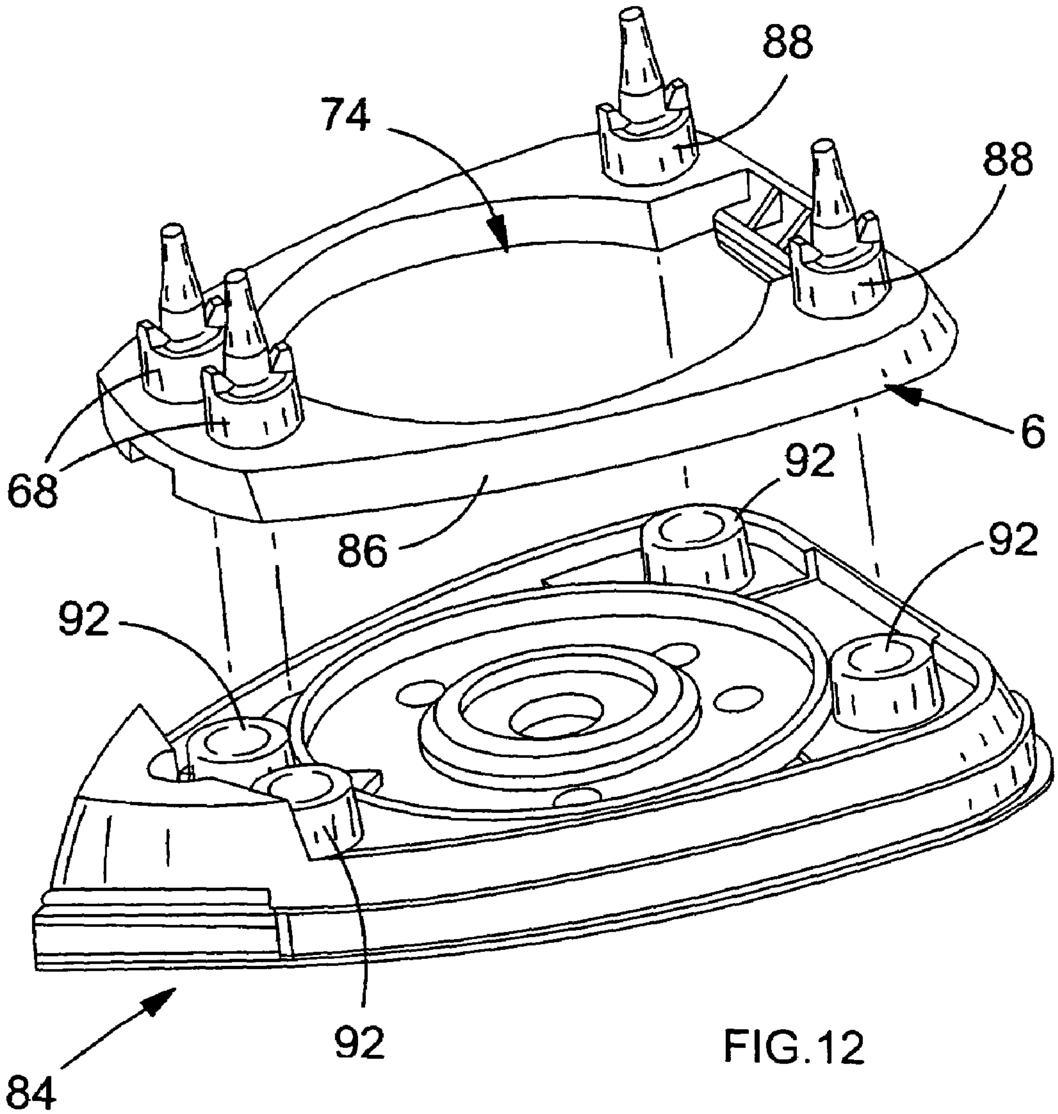
FIG. 12 is a perspective view of a mounting platen and sanding shoe of the sander of FIG. 10.
Figure 13:
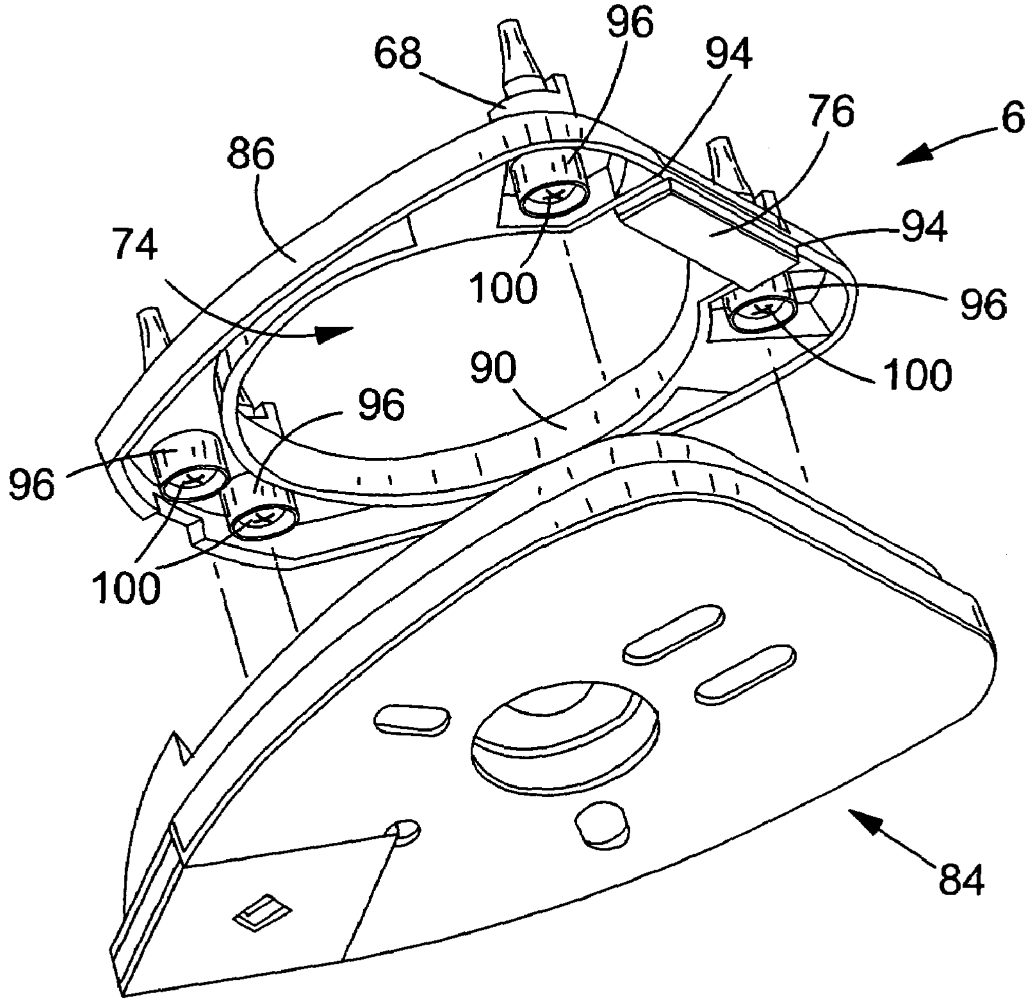
FIG. 13 is a perspective view of the mounting platen and sanding shoe of FIG. 10, showing the attachment side of the mounting platen.

FIGS. 12 and 13 show in more detail features of the mounting platen 8, which remains on the housing when the platens 84 and 8 are interchanged. From these Figures it can be seen that the mounting platen 8 is generally a blunt shoe shape, and is substantially flat, with a peripheral lip 86 extending downwards towards the sanding shoe 84. The large central aperture 74, allowing it to be positioned around the second drive shaft, radially distant therefrom, so there is no direct contact between the mounting platen 6 and the second drive shaft 62, can also be clearly seen in these Figures, as can the four hollow right cylindrical portions 88, integrally formed with the surface of the mounting platen 8, and projecting into the body of the housing 4 i.e. upwards as shown in the Figures. An inner lip 90 extends downwards around most of the central aperture 74, and joins to the outer peripheral lip 92 of the mounting platen 6 at two points 94 on one short side of the mounting platen 8.

In line with the upwardly directed projections 88, and projecting in the other direction, from the opposite surface of the mounting platen 6 are four hollow, generally cylindrical pin shaped coupling members 96. The pin-shaped coupling members 96 are also integrally formed with the mounting platen 8. The substantially flat mounting platen with its projecting portions 88 and 96 are preferably integrally injection moulded from polymeric material or diecast zinc.

The four coupling pins 96, provided on the opposite surface of the mounting platen 6 from the flexible legs 64, in corresponding positions, i.e. vertically aligned with the legs 64 as shown in FIGS. 12 and 13 have a dual function; the pins 96 secure the legs 64 in place, and couple with an orbital sanding head 84, in use, to prevent free rotation of that sanding head (FIGS. 11 to 13).

Each coupling pin 96 is an integrally formed part shaped as a hollow cylinder. The pin member 96 contains a radially directed flange 98 extending partially into the hollow of the pin member 96, to act as a stop member for a separate externally screw threaded headed bolt member 100 (see FIGS. 10 and 11). The externally screw threaded bolt member 100 passes through the hollow central pin member 96, and is shaped and sized to slide into the hollow pin member until its head abuts the internal stop flange 98, and then screw into inner hollow screw threaded cylindrical recesses at the mounting platen end of the flexible legs 64. By this screw threaded bolt member 100 the flexible legs 64 are therefore secured to the mounting platen.

As best seen in FIG. 11, each pin member 96 is located between part of the peripheral lip 86 and the inner lip 90 of the mounting platen 6. The pin member 96 of the coupling means acts to couple to the orbital sanding shoe 84 to prevent its free rotation.

As shown in FIG. 11, when mounted on the drive unit, the orbital sanding shoe 84 is secured to the spindle of second drive shaft 62 by means of the same nut 70 and washer 72 used to secure the random orbit sanding platen 8 of FIG. 10. The orbital sanding shoe 84 is substantially flat, and is provided, on its upper major surface in the orientation shown in the Figure, with coupling means 92 shaped to co-operate with the coupling means 96 of the mounting platen 6. The coupling means 92 each comprise a hollow right-cylindrical stub, projecting upwards from the surface of the sanding shoe 84. The hollow right cylindrical projection 92 is shaped so that it provides a recess into which the pin member 96 of the mounting platen fits. One side of the cylindrical projection 92 on the sanding shoe 84 fits between the peripheral lip 86 of the mounting platen 6 and the outer surface of the pin member 96 of the mounting platen 6; and the opposite side of the cylindrical projection 92 on the sanding shoe 84 fits between the inner lip 90 of the mounting platen 6 and the opposite outer surface of the pin member 96 of the mounting platen 6.

By means of the co-operating coupling means 96 and 92, the sanding shoe 84 and mounting platen 6 are therefore securely located substantially to prevent relative movement between the mounting platen 6 and the sanding shoe 84 in a plane perpendicular to the axis of the bearing 60. Relative movement parallel to the axis of the bearing 60 is, of course, prevented by the nut 70 and washer 72 attachment.

In operation, when the motor is switched on and the drive shafts 50 and 62 turn, since the sanding shoe 84 is prevented from rotation relative to the mounting platen 6, and the mounting platen 6 is fixed relative to the housing 4 by means of legs 64, then free rotation of the sanding shoe 84 around the bearing 60 axis is prevented. The flexibility in the legs 64, however, allows the sanding platen 84 to follow the rotating motion of the eccentric spindle itself driven by the first drive shaft 50. Therefore the sanding shoe 84 is allowed to oscillate within a fixed orbit due to the flexibility of the legs 64.

In order to ensure that the sanding shoe 84 is always located the correct way round on the mounting platen 6, the coupling means 96 and 92 are non uniformly spaced over the surface of the mounting platen 6 and the sanding platen 84, those on one lateral side of the platens (the right as shown in FIGS. 12 and 13) being further apart from each other than those on the other lateral side of the platens (the left as shown in the Figures).

It will be appreciated by persons skilled in the art that the above embodiments have been described by way of example only, and not in any limitative sense, and that various alterations and modifications are possible without departure from the scope of the invention as defined by the appended claims.

The invention claimed is:

1. A gripping portion for a power tool having a housing and a motor within said housing for actuating a working member of the tool, the gripping portion adapted to be engaged by a hand of a user of the tool and comprising:

at least one blister pack comprising first and second flexible sheets defining at least one gel-containing chamber therebetween, wherein each said gel-containing chamber contains a vibration damping gel material and said first and second sheets are sealed to each other at a sealing portion at the periphery of each said gel-containing chamber; and at least one clamping plate for fixing at least one said blister pack to said housing and including a body portion and at least one protrusion extending from said body portion and adapted to extend through the sealing portion of said blister pack and engage a respective aperture in the housing.

2. A gripping portion according to claim 1, wherein said sealing portion includes at least three apertures to enable respective said protrusions to pass therethrough.

3. A gripping portion according to claim 1, wherein at least one said protrusion is adapted to protrude through said housing to an opposite side from said body portion.

4. A gripping portion according to claim 3, wherein the protrusions and corresponding apertures are irregularly spaced.

5. A tool according to claim 1, wherein at least one said protrusion is fixed to the corresponding said aperture by means of deformation of an end of said protrusion remote from the corresponding said body portion.

6. A tool according to claim 5, wherein an end at least one said protrusion is deformed by means of heat.

7. A tool according to claim 6, wherein an end of at least one said protrusion is deformed by means of ultrasound.

8. A tool according to claim 7, wherein the tool is a sander.

9. A method of assembling a gripping portion for a power tool, the method comprising:

locating at least one fixing member having a body portion and at least one protrusion extending from said body portion on a housing of a power tool having at least one aperture such that at least one said protrusion passes through a sealing portion at the periphery of a blister pack containing vibration reducing gel material, and engages a respective said aperture; and deforming an end of at least one said protrusion remote from said body portion to fix the protrusion to the corresponding said aperture.

10. A method according to claim 9, further comprising the step of locating at least one said blister pack on at least one said fixing member, such that at least one said protrusion extends through the sealing portion of at least one said blister pack, prior to location of said fixing member on said housing.

11. A method according to claim 10, wherein the step of deforming an end of at least one said protrusion comprises deforming by means of heat.

12. A method according to claim 11, wherein the step of deforming an end of at least one said protrusion comprises deforming by means of ultrasound.

* * * * *